Dec. 1, 1953 H. R. SMITH 2,661,443

TELEVISION KEYSTONE BALANCE CONTROL CIRCUIT

Filed Dec. 30, 1949

INVENTOR.
HARRY R. SMITH

BY Darby & Darby
ATTORNEYS

Patented Dec. 1, 1953 2,661,443

UNITED STATES PATENT OFFICE 2,661,443

TELEVISION KEYSTONE BALANCE CONTROL CIRCUIT

Harry R. Smith, Glen Ridge, N. J., assignor to Allen B. Du Mont Laboratories, Inc., Passaic, N. J., a corporation of Delaware Application December 30, 1949, Serial No. 136,092

3 Claims. (Cl. 315—24)

This invention relates to an electrical circuit for producing a predetermined pattern on the screen of a cathode ray tube. It relates particularly to circuits for distorting the raster on cathode ray tubes having off center electron guns such as iconoscope tubes, certain projection tubes, and tubes of the type disclosed in U. S. Patent 2,480,848.

Throughout this specification the term "iconoscope type cathode ray tube" will be used to denote any cathode ray tube having an off center electron gun.

The keystone pattern of iconoscope type tubes is familiar to those skilled in the art. To cause the pattern to assume a normal rectangular shape it is necessary to introduce correcting voltages into the deflection amplifiers. The correcting voltage for the horizontal amplifier may be a sawtooth voltage at the vertical frequency which is used to modulate the horizontal deflecting voltage before it passes through the horizontal output transformer. It is necessary for the horizontal output transformer to pass the comparatively low vertical frequency without distortion as well as harmonics of the horizontal frequency, up to about the tenth, in order that such a system may operate properly.

This invention consists in adding a controlled current, varying at the vertical frequency, to the horizontal deflecting current flowing through the horizontal deflecting coils.

An object of this invention is to provide an improving mixing circuit.

Another object is to provide an improved keystone correction circuit for use with cathode ray tubes having off center electron guns.

Another object is to correct for deficiencies in the deflection yoke of magnetically deflected cathode ray tubes.

Still another object is to compensate for the limited frequency response of transformers.

Figure 1:
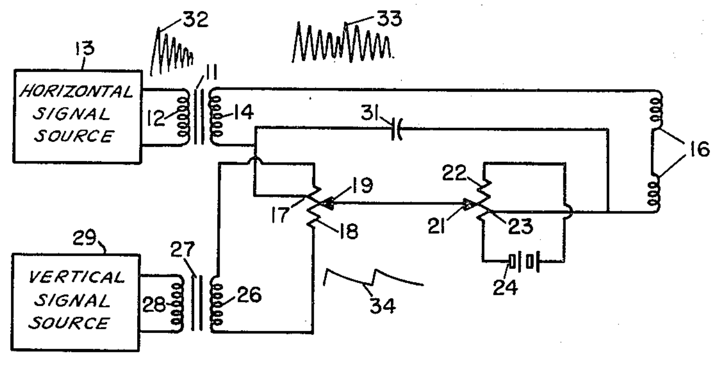
Figure 2A:
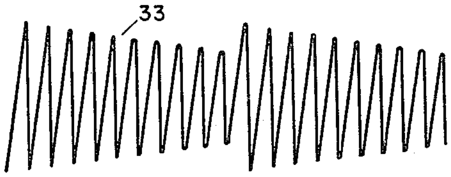
Figure 2B:
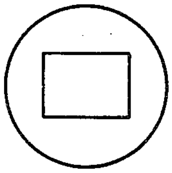
Figure 3A:
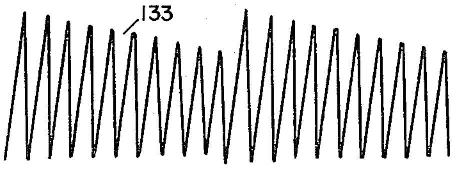
Figure 3B:
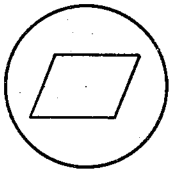
Figure 4A:
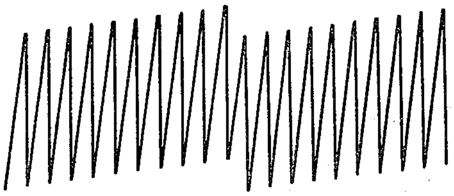
Figure 4B:
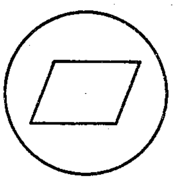

Further objects will be apparent to those skilled in the art after studying the following specification and drawings in which:

Figure 1, partly in schematic and partly in block diagram form, shows one embodiment of the invention;

Figure 2*a* shows a horizontal sawtooth current wave modulated unequally by a vertical sawtooth wave;

Figure 2*b* shows the pattern on the face of an iconoscope type cathode ray tube when a deflection current such as that shown in Figure 2*a* is used;

Figure 3*a* shows the desired deflection current for an iconoscope type cathode ray tube;

Figure 3*b* shows the normal rectangular pattern produced on the screen of an iconoscope type cathode ray tube by a deflection current of the type shown in Figure 3*a*;

Figure 4*a* shows a horizontal sawtooth current wave with a vertical sawtooth wave added; and Figure 4*b* shows the pattern produced on the face of a standard cathode ray tube when standard deflection currents are applied to a yoke in which the magnetic fields are not at right angles to each other.

In Figure 1 a horizontal transformer 11 is shown having its primary 12 connected to a source 13 of horizontal voltage, and its secondary 14 connected to one end of a horizontal deflection coil 16. The other end of the secondary 14 is connected to a tap 17 on the keystone balance control 18. The contact arm 19 of this potentiometer is connected to the contact arm 21 of the horizontal positioning control 22. A tap 23 on this control 22 is connected to the other end of the horizontal deflection coil 16. The control 22 is connected across a source 24 of horizontal positioning current which is shown here as a battery.

The keystone balance control 18 is connected across the secondary 26 of a transformer 27, which may be an audio transformer having its primary 28 connected to a vertical deflection sawtooth signal generator 29. A capacitor 31 is connected from the center tap 17 of the keystone control 18 to the center tap 23 of the horizontal positioning control 22 to provide a low impedance path between these points for the high frequencies in the horizontal deflection wave.

Under normal operating conditions of the circuit in Figure 1 the horizontal voltage source 13 presents a deflection voltage of the type indicated by reference character 32, to the primary winding 12 of the output transformer 11. This voltage wave 32 is preferably an equally modulated horizontal deflecting wave, so that in passing through the transformer 11 it will not be distorted and the resulting current wave 33, as shown in Figure 2*a*, flowing through the secondary 14 of the transformer 11 will also be symmetrical. This wave, flowing through the horizontal deflection coils 16, would normally be expected to produce a pattern such as is shown in Figure 2*b* on the face of the iconoscope type tube. However, non-symmetrical yoke or tube construction frequently results in a raster such as is shown in Figure 3*b*.

The vertical signal source 29 causes a substantially sawtooth current wave 34 to flow in a secondary 26 of a transformer 27. If the contact 19 on the potentiometer 18 is rotated so as not to be electrically contiguous with the tap 17, a portion of the current 34 will be diverted to flow through the secondary 14 and the coils 16. The amplitude and direction of flow of the diverted portion of the current 34 are determined by the direction and amount of rotation of the contact 19 from the zero point; i. e., the point at which it makes direct electrical contact with the tap 17. The addition of the current 34 to the equally modulated current wave 33 shown in Figure 2*a* results in the non-symmetrical current wave 133 shown in Figure 3*a*. If the proper amplitude and polarity of the current 34 is added to the current 33, the resultant current 33 will counteract the non-symmetrical yoke or tube construction and produce the desired, rectangular raster as shown in Figure 2*b*.

Similarly the amount and direction of the D. C. positioning current flowing through the coils 16 due to the direct current flowing through the potentiometer 22 are controlled by the rotation of the contact 21 with respect to the tap 23.

The high frequencies of the horizontal deflecting current are bypassed by means of the condenser 31 and do not flow through the potentiometers 22 and 18.

Although the potentiometer 18 is shown with a tap 17 intermediate the ends thereof, this is a matter of convenience only since, if the desired polarity of the additional current through the coils 16 derived from the current 34 is known, it would be possible to connect one end of the secondary 14 to one end of the potentiometer 18 instead of to the tap 17. In such case, only the amplitude of the additional current through the coils 16 could be controlled by the rotation of the contact 19. The polarity would always remain the same. The positioning circuit comprising the potentiometer 22 and the voltage source 24 has been inserted for purposes of illustration with known circuit elements and are not necessary to the operation of this invention. For instance, if no positioning were necessary, the contact 19 could be connected directly to the junction of the condenser 31 and the coils 16.

The raster in Figure 4*b* is the result of having the vertical deflection coils rotated clockwise (as viewed from the face of a standard cathode ray tube) with respect to the horizontal deflection coils. The circuit of Figure 1 may be used to overcome this type of distortion just as it was used to counteract the keystone distortion. In this case the voltage wave 32 supplied by the horizontal signal source 13 is not modulated and the amplitude of each of the horizontal voltage oscillations is the same. The current wave-form through the coils 16 is shown in Figure 4*a* with the vertical saw component added.

It will be apparent that modifications of the invention may be made, the scope thereof being defined by the following claims.

What is claimed is:

1. In a television deflection circuit for a cathode ray tube having an off center electron gun, a source of horizontal deflecting voltage, a horizontal output transformer having a primary and a secondary winding, said primary being connected to said source of voltage, a horizontal deflection coil, one end of said deflection coil being connected to a first tap on said secondary winding, a source of vertical deflection voltage, a vertical output transformer having a primary and a secondary winding, said primary of said vertical transformer being connected to said source of vertical deflection voltage, an impedance connected in series with said secondary winding on said vertical output transformer, a second tap on said secondary of said horizontal output transformer being connected to a point on said impedance, the other end of said deflection coil being connected to another point on said impedance.

2. The circuit of claim 1 in which one of said points on said impedance is variable with respect to the other of said points.

3. In a television deflection circuit, a plurality of sources of deflection voltages, a first transformer having a primary and a secondary winding, said primary winding being connected to a first said source of deflection voltage, a deflection coil, one end of said coil being connected to a first tap on said secondary winding, a second transformer having a primary and a secondary winding, said primary of said second transformer being connected to a second said source of deflection voltage, an impedance connected in series with said secondary winding of said second transformer, a second tap on said secondary of said first transformer connected to a point on said impedance, the other end of said deflection coil being connected to another point on said impedance.

HARRY R. SMITH.

References Cited in the file of this patent

UNITED STATES PATENTS

| Number | Name | Date |
|---|---|---|
| 1,485,727 | Sindeband | Mar. 4, 1924 |
| 2,477,557 | Torsch | July 26, 1949 |
| 2,505,011 | Smyth | Apr. 25, 1950 |